United States Patent
Takemoto

(10) Patent No.: US 7,627,137 B2
(45) Date of Patent: Dec. 1, 2009

(54) IMAGE COMPOSITION SYSTEM, IMAGE COMPOSITION METHOD, AND IMAGE COMPOSITION APPARATUS

(75) Inventor: Rika Takemoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 617 days.

(21) Appl. No.: 11/128,366

(22) Filed: May 13, 2005

(65) Prior Publication Data
US 2005/0256396 A1 Nov. 17, 2005

(30) Foreign Application Priority Data
May 17, 2004 (JP) ............................. 2004-146640

(51) Int. Cl.
G06K 9/00 (2006.01)
G09G 5/00 (2006.01)
(52) U.S. Cl. ....................... 382/103; 345/633
(58) Field of Classification Search ................. 382/128, 382/103, 291; 345/633
See application file for complete search history.

(56) References Cited

U.S. PATENT DOCUMENTS

| | | | | |
|---|---|---|---|---|
| 6,049,622 | A * | 4/2000 | Robb et al. .................. | 382/128 |
| 6,064,749 | A * | 5/2000 | Hirota et al. ................ | 382/103 |
| 6,094,625 | A * | 7/2000 | Ralston ....................... | 702/150 |
| 6,792,370 | B2 | 9/2004 | Satoh et al. .................. | 702/95 |
| 6,834,250 | B2 | 12/2004 | Uchiyama et al. ........... | 702/150 |
| 7,333,642 | B2 * | 2/2008 | Green ......................... | 382/128 |
| 2003/0210812 | A1 * | 11/2003 | Khamene et al. ............. | 382/128 |
| 2003/0227470 | A1 * | 12/2003 | Genc et al. .................. | 345/633 |
| 2004/0070611 | A1 * | 4/2004 | Tanaka et al. ................ | 345/757 |
| 2004/0080548 | A1 * | 4/2004 | Daily et al. ................. | 345/850 |
| 2004/0254454 | A1 * | 12/2004 | Kockro ........................ | 600/424 |

FOREIGN PATENT DOCUMENTS

| | | |
|---|---|---|
| EP | 1 404 126 | 3/2004 |
| JP | 2002-228442 | 8/2002 |
| JP | 2004-118734 | 4/2004 |

OTHER PUBLICATIONS

Extending augmented reality with natural feature tracking, Jun Park, Suya You, and Ulrich Neumann, Proc. SPIE 3524, 105-114, 1998.*

(Continued)

*Primary Examiner*—Samir A. Ahmed
*Assistant Examiner*—Li Liu
(74) *Attorney, Agent, or Firm*—Fitzpatrick, Cella, Harper & Scinto

(57) ABSTRACT

An information processing method includes the steps of acquiring a sense image of an image sensing unit, acquiring coordinate values of registered indices, detecting image positions of the registered indices in the sense image, and calculating position and orientation of the image sensing unit on the basis of the detected image positions of the registered indices and the coordinate values of the registered indices. Additional steps include detecting an image position of an additional index in the sense image in accordance with a user's instruction, calculating a coordinate value of the additional index using the image positions of the registered indices, the coordinate values of the registered indices, the position and orientation of the image sensing unit, and the image position of the additional index, and registering the calculated coordinate value of the additional index as a registered index.

16 Claims, 9 Drawing Sheets

OTHER PUBLICATIONS

Jun Park et al., "Extending Augmented Reality with Natural Feature Tracking" Proceedings of SPIE (The International Society for Optical Engineering), vol. 3524-15, Nov. 4, 1998.

Tomokazu Sato et al., "Camera Parameter Estimation from a Long Image Sequence by Tracking Markers and Natural Features," Journal of IEICE, D-11, vol. J186-D-11, No. 10, pp. 1431-1440, Oct. 2003.

M. Kanbara, et al., "Development of Video See-through Augmented Reality System with a Wide Range of Registration by Switching Tracked Markers", vol. 99, No. 574, The Institute of Electronics, Information and Communication Engineers, pp. 51-56 (Jan. 20, 2000) (with English abstract).

Japanese Office Action dated May 29, 2009, in related corresponding Japanese Patent Appln. No. 2004-146640.

* cited by examiner

F I G. 5A
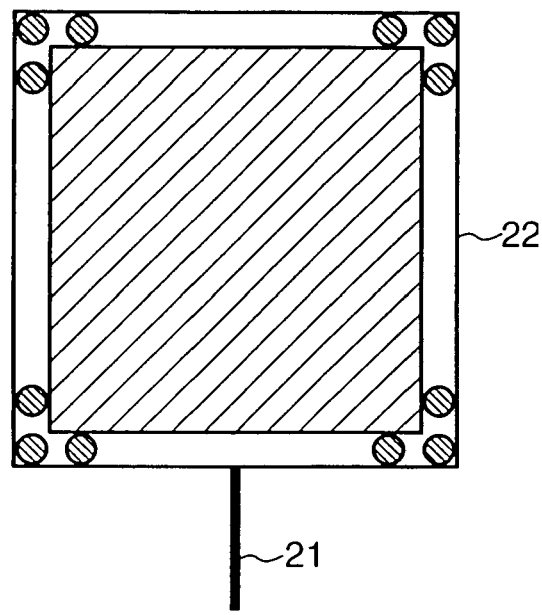
F I G. 5B
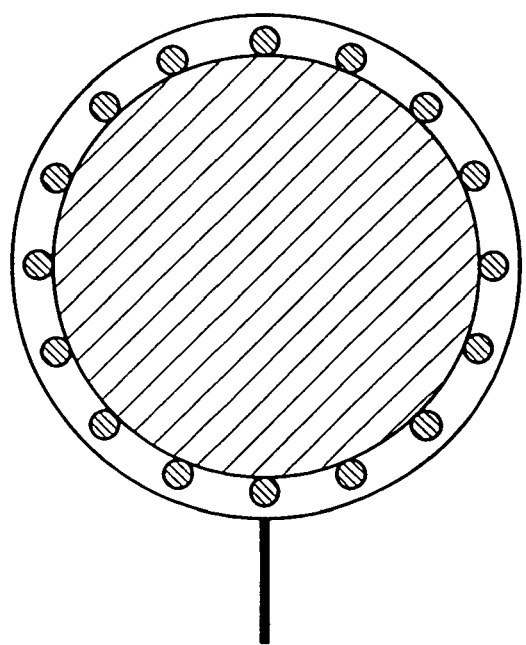

IMAGE COMPOSITION SYSTEM, IMAGE COMPOSITION METHOD, AND IMAGE COMPOSITION APPARATUS

FIELD OF THE INVENTION

The present invention relates to an image composition system, image composition method, and image composition apparatus and, more particularly, to an image composition system, image composition method, and image composition apparatus, which synthesize a virtual image to a sense image on a physical world using known index information whose world coordinates are known.

BACKGROUND OF THE INVENTION

In recent years, studies about mixed reality (to be abbreviated as MR hereinafter) that aims at seamless joint of real and virtual spaces have been extensively made. MR has received a lot of attention as a technique that aims at coexistence of a virtual space (to be referred to as VR (virtual reality) hereinafter) which can be experienced in only a situation separated from a physical space, and augments virtual reality.

An image display apparatus which presents MR is implemented by an apparatus which synthesizes an image of a virtual space (e.g., a virtual object, text information, and the like rendered by computer graphics (to be abbreviated as CG hereinafter)) onto an image of a physical space captured by an image sensing device such as a video camera or the like. For example, as an MR system, a system which additionally displays corresponding position information and a name (i.e., images of a virtual space) when the user wears an HMD (Head Mount Display) and looks at a landscape (i.e., an image of a physical space), or the like is known.

MR requires high-precision registration between the physical space and virtual space. Many efforts have been conventionally made for such registration problem.

The registration problem in MR amounts to obtaining the three-dimensional position and orientation of a camera as a viewpoint position on a coordinate system (to be referred to as a world coordinate system hereinafter) set on the physical space. Note that the world coordinate system need not be fixed on the physical space. For example, if the interior of a vehicle is defined as a virtual space, the world coordinate system set on the physical space can be set to move in accordance with the movement of the vehicle.

As a method of measuring the position and orientation of the camera on the world coordinate system, a three-dimensional (3 D) position/orientation sensor such as a magnetic sensor, optical sensor, ultrasonic sensor, or the like may be used. However, since the camera position measured by such position/orientation sensor has insufficient precision, if a virtual object is synthesized and displayed on the physical space on the basis of the position and orientation measured by the sensor, the object is displayed at a position deviated from a required position.

To solve this problem, conventionally, as a method of correcting sensor errors or a method of measuring the position and orientation of the camera on the world coordinate system without using any sensor, the following method is available (see, e.g., Japanese Patent Laid-Open No. 2002-228442 (U.S. Pat. No. 6,834,250)). That is, a plurality of indices (markers) whose coordinate (world coordinate) values on a 3 D space are known are laid out and are sensed by the camera, and the position and orientation of the camera that meet the relationship between the world coordinates of markers and sense image coordinates are calculated.

In general, if the positions of a plurality of points (three or more points theoretically; six or more points required for a stable solution) whose 3 D positions are known on the sense image can be obtained, the position and orientation of the camera viewpoint can be calculated based on their correspondence (to solve a so-called PnP problem).

When such registration method using markers is used, markers whose world coordinate values are known must be prepared in advance. An operation required to prepare for markers whose world coordinate values are known for the purpose of registration will be referred to as "marker registration" hereinafter. The markers may be one which are artificially laid out or may use natural features or the like. The markers are preferably laid out to always be sensed by a moving camera.

Marker registration is to input information such as features, locations, and the like of markers by laying out markers on the physical space (or for the markers that have already been laid out). In marker registration, the operation for precisely inputting 3 D layout information of the markers imposes a heavy load on the operator, and it is difficult to lay out the markers so as to always be sensed by the moving camera.

In the conventional system which makes the user who wears the HMD experience MR, there is no means for readily adding markers. For example, if the user feels the need for laying out new markers since no markers appear on an HMD camera image due to an insufficient number of markers which are laid out, he or she cannot easily and additionally register markers while wearing the HMD.

SUMMARY OF THE INVENTION

The present invention has been made to solve the aforementioned problems individually or together, and has as its object to facilitate registration of an additional marker.

According to the present invention, the foregoing object is attained by providing an information processing method comprising:

acquiring a sense image of an image sensing unit;

acquiring coordinate values of registered indices;

detecting an image position of an additional index in the sense image in accordance with a user's instruction;

detecting image positions of the registered indices in the sense image;

calculating a coordinate value of the additional index using the image positions of the registered indices, the coordinate values of the registered indices, and the image position of the additional index; and registering the additional index as a registered index using the calculated coordinate value.

In a preferred embodiment, the image sensing unit comprises a video see-through Head Mounted Display.

In a preferred embodiment, a position and orientation of the image sensing unit are calculated using the image positions of the registered indices and coordinate values of registered indices.

In a preferred embodiment, the method further comprises:

generating a virtual image on the basis of a position and orientation of the image sensing unit; and compositing the sense image and the virtual image.

In a preferred embodiment, when the coordinate value of the additional index cannot be calculated, the additional index is temporarily registered.

In a preferred embodiment, when the coordinate value of the temporarily registered additional index is calculated from another sense image, the temporarily registered additional index is regularly registered using the calculated coordinate value.

In a preferred embodiment, the image position of the additional index is detected based on a position of an operation unit which indicates an additional index on a physical space.

In a preferred embodiment, information of the registered index includes information for specifying a shape, color information, and ID information in addition to the coordinate value, and
the method further comprises:
detecting a shape region corresponding to the information for specifying the shape in an image region set based on the position of the operation unit; and
obtaining the color information on the basis of a color in the detected shape region.

In a preferred embodiment, the operation unit comprises a stylus, and a position of the stylus is measured.

In a preferred embodiment, the operation unit has a predetermined frame, and designates the additional index by locating the additional frame within the predetermined frame.

In a preferred embodiment, the method further comprises:
detecting a position of a predetermined portion of a user who indicates an additional index on a physical space; and
detecting the image position of the additional index on the basis of the detection result.

According to the present invention, the foregoing object is attained by providing an information processing method comprising:
acquiring a sense image of an image sensing unit;
acquiring coordinate values of registered indices;
detecting an image position of an additional index in the sense image;
detecting image positions of the registered indices in the sense image;
calculating a coordinate value of the additional index using the image positions of the registered indices, the coordinate values of the registered indices, and the image position of the additional index;
calculating a feature amount of the additional index from the sense image; and
registering the coordinate value and the feature amount of the additional index.

In a preferred embodiment, the feature amount is color information.

According to the present invention, the foregoing object is attained by providing an information processing apparatus comprising:
first acquisition means for acquiring a sense image of an image sensing unit;
second acquisition means for acquiring coordinate values of registered indices;
first detection means for detecting an image position of an additional index in the sense image in accordance with a user's instruction;
second detection means for detecting image positions of the registered indices in the sense image;
calculation means for calculating a coordinate value of the additional index using image positions of the registered indices, the coordinate values of the registered indices, and the image position of the additional index; and
registration means for registering the additional index as a registered index using the calculated coordinate value.

According to the present invention, the foregoing object is attained by providing an information processing apparatus comprising:

first acquisition means for acquiring a sense image of an image sensing unit;
second acquisition means for acquiring coordinate values of registered indices;
first detection means for detecting an image position of an additional index in the sense image;
second detection means for detecting image positions of the registered indices in the sense image;
first calculation means for calculating a coordinate value of the additional index using image positions of the registered indices, the coordinate values of the registered indices, and the image position of the additional index;
second calculation means for calculating a feature amount of the additional index from the sense image; and
registration means for registering the coordinate value and the feature amount of the additional index.

According to the present invention, the foregoing object is attained by providing a program for controlling an information processing apparatus, comprising:
a program code of a first acquisition step of acquiring a sense image of an image sensing unit;
a program code of a second acquisition step of acquiring coordinate values of registered indices;
a program code of a first detection step of detecting an image position of an additional index in the sense image in accordance with a user's instruction;
a program code of a second detection step of detecting image positions of the registered indices in the sense image;
a program code of a calculation step of calculating a coordinate value of the additional index using the image positions of the registered indices, the coordinate values of the registered indices, and the image position of the additional index; and
a program code of a registration step of registering the additional index as a registered index using the calculated coordinate value.

According to the present invention, the foregoing object is attained by providing a program for controlling an information processing apparatus, comprising:
a program code of a first acquisition step of acquiring a sense image of an image sensing unit;
a program code of a second acquisition step of acquiring coordinate values of registered indices;
a program code of a first detection step of detecting an image position of an additional index in the sense image;
a program code of a second detection step of detecting image positions of the registered indices in the sense image;
a program code of a first calculation step of calculating a coordinate value of the additional index using the image positions of the registered indices, the coordinate values of the registered indices, and the image position of the additional index;
a program code of a second calculation step of calculating a feature amount of the additional index from the sense image; and
a program code of a registration step of registering the coordinate value and the feature amount of the additional index.

The present invention allows easy registration of an additional marker by the operator on the sense image of the image composition system. That is, additional layout of indices from a viewpoint of experiencing MR of the physical and virtual spaces can be facilitated.

Other features and advantages of the present invention will be apparent from the following description taken in conjunc-

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5A shows a UI example for marker region designation in the second embodiment;

FIG. 5B shows a UI example for marker region designation in the second embodiment;

DETAILED DESCRIPTION OF THE PREFERRED EMBODIMENTS

Preferred embodiments of the present invention will now be described in detail in accordance with the accompanying drawings.

First Embodiment

An example of an image composition apparatus according to this embodiment is an MR system which displays CG in accordance with the user's position and orientation (visual field) when he or she wears a display device and looks at a landscape. Note that details of the system arrangement in this embodiment will be described later.

This embodiment uses, as the display device of the MR system, a video see-through HMD that incorporates a position/orientation measuring sensor. That is, the HMD incorporates the position/orientation measuring sensor and a camera.

The position and orientation of the user are calculated using measurement values output from the built-in position/orientation sensor, but outputs from the position/orientation sensor include measurement errors. Markers whose world coordinates are known are sensed by the camera incorporated in the HMD, and the measurement errors of the position/orientation sensor are corrected using the world coordinates of the markers and camera image coordinates.

The MR system of this embodiment comprises an additional marker registration function.

The additional marker registration function is used in, e.g., the following situation.

A plurality of markers are laid out around the user, and have undergone marker registration in advance. However, the number of markers is not large enough to always be sensed by the HMD camera of the user who freely moves around. In such case, the user can additionally register a marker at an appropriate position on the space, and sets an environment so that the physical space and a virtual object are precisely registered even when he or she freely moves around the space.

The user of the MR system of this embodiment can additionally register a new marker (marker registration) using a stylus UI (user interface) while wearing the HMD. Marker information of this embodiment includes five pieces of information, i.e., a marker ID, color, shape, size, and world coordinates. Note that the shape and size are prescribed in this embodiment.

Figure 1A:
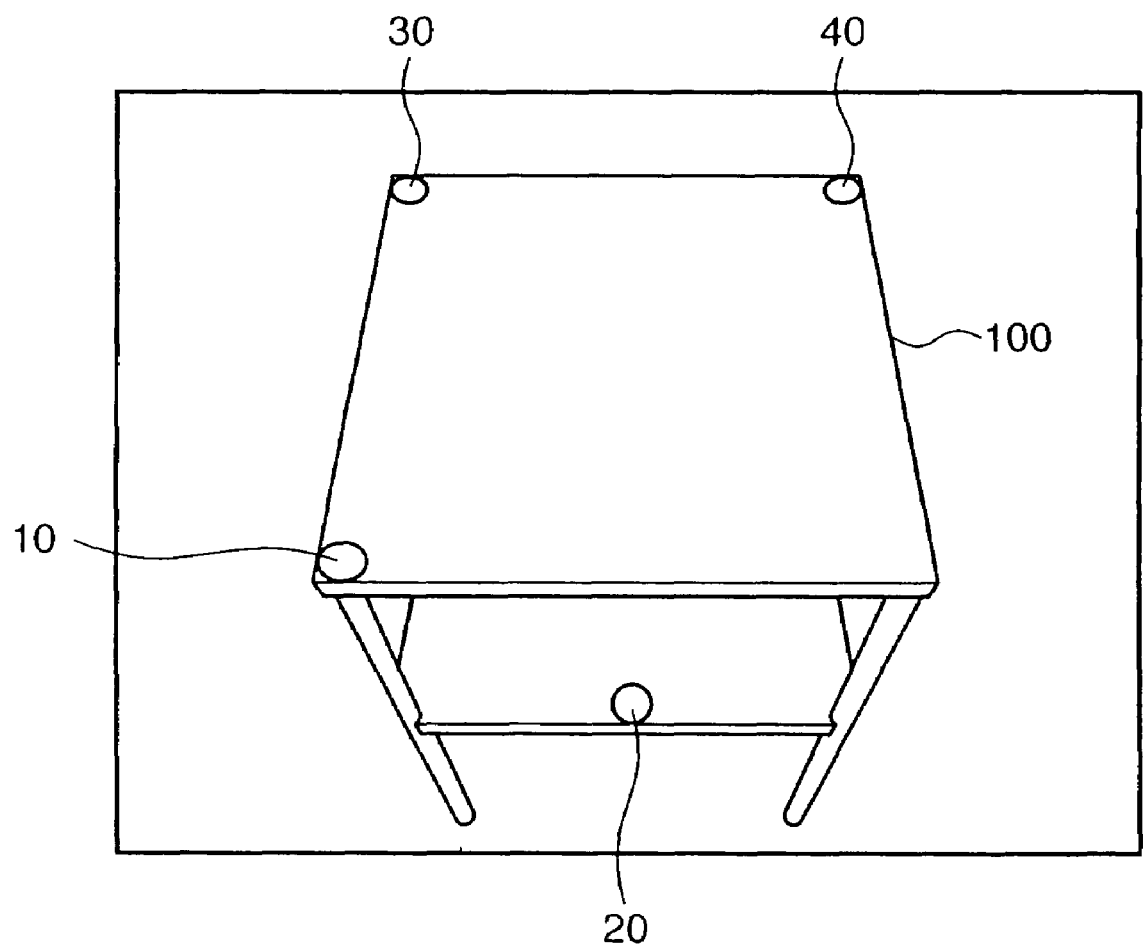
FIG. 1A shows a state of registration of an additional marker in the first embodiment.
Figure 1B:
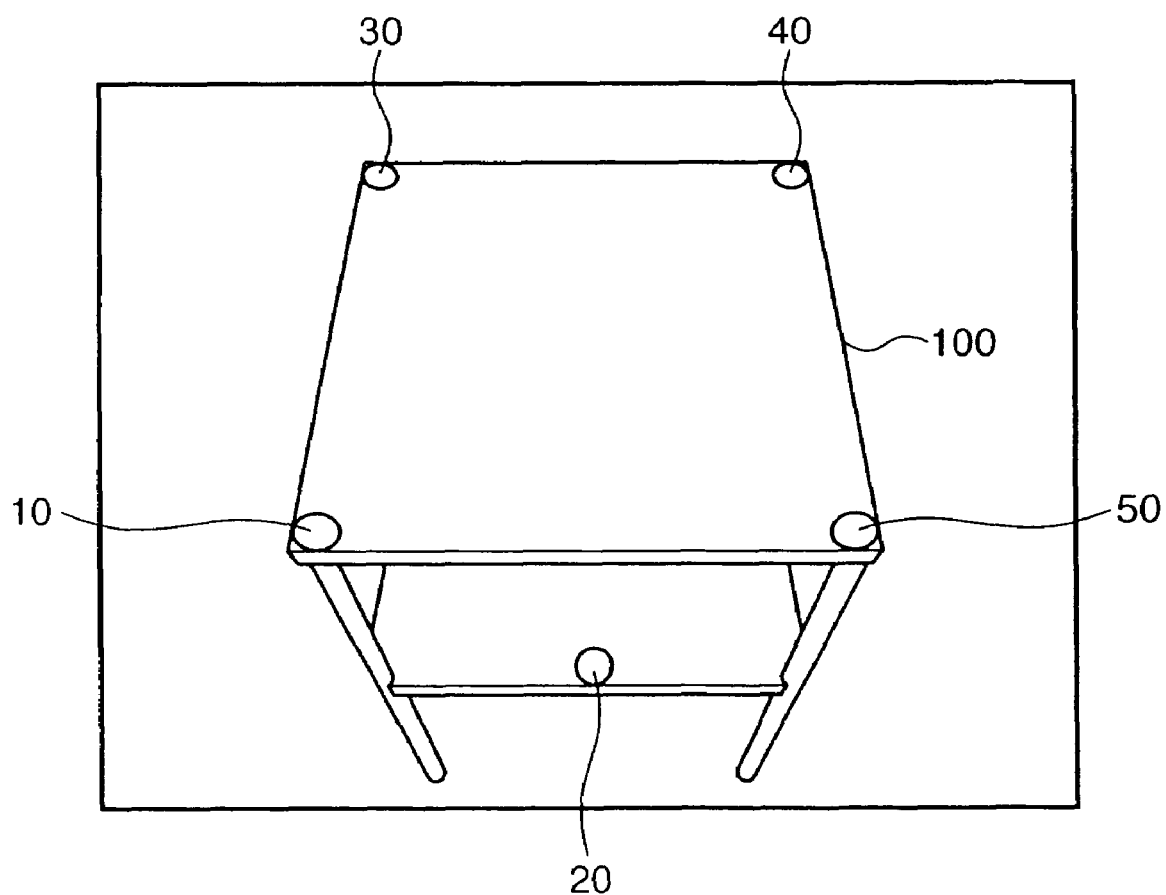
FIG. 1B shows a state of registration of an additional marker in the first embodiment.
Figure 1C:
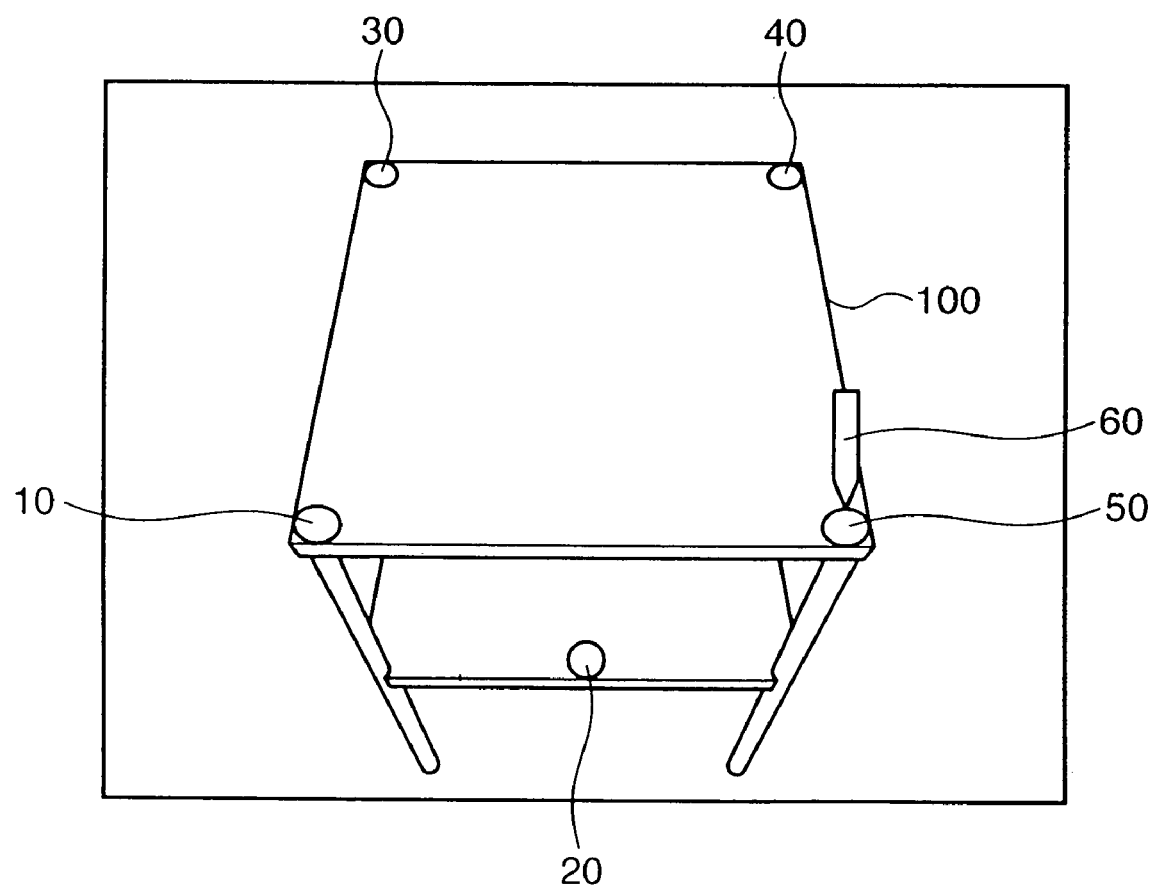
FIG. 1C shows a state of registration of an additional marker in the first embodiment.

FIGS. 1A to 1C show a state wherein a marker is added in this embodiment.

A sequence for additionally registering a marker 50 on the lower right corner on a desk 100, as shown in FIG. 1B, in a scene in which four markers (10, 20, 30, and 40) have already been laid out around the desk 100 as an object, as shown in FIG. 1A, will be explained below. The marker (to be referred to as an additional marker hereinafter) to be added on the desk 100 is laid out, as shown in FIG. 1B, and the user moves a stylus 60 so that its tip points to the marker to be additionally registered (additional marker 50), and then presses a stylus button as a marker add button (not shown).

The processing in the system upon registering the additional marker 50 in accordance with the aforementioned operation will be described below. Since the shape and size of each marker in this embodiment are prescribed, the marker can be registered by calculating its color and world coordinates.

A region having the prescribed shape (a region occupied by the marker 50 in this case) is detected from an image region near the tip of the stylus 60 on the HMD sense image, and the color of the detected region is set as the color of the marker.

Calculation of the world coordinates of the additional marker 50 will be explained below. When a sufficient number of pieces of the already registered marker information exist in the HMD sense image, the world coordinates of the additional marker 50 can be calculated in the following steps.

(1) The image sensing position is calculated on the basis of a plurality of (three or more in this case) registered markers (markers 10, 20, 30, and 40 in this case) which exist in sense images sensed by right and left image sensing devices of the HMD. In this manner, two sense images which include images of the additional marker 50, and whose image sensing positions and orientations are known are obtained.

(2) The world coordinates of the additional marker 50 are calculated using the principle of triangulation on the basis of the image sensing positions and orientations, the image positions of the registered markers, and their world coordinates.

Note that the world coordinate calculation method of the additional marker is not limited to the aforementioned method.

In the example of step (1), two sense images which include images of the additional marker and whose image sensing positions are known are obtained by the right and left image sensing devices of the HMD. Alternatively, by utilizing dynamic movement of the HMD, two sense images sensed at different times may be selected. In this case, since both the sense images must have different image sensing positions and include images of the additional marker 50, two images which have appropriately different image sensing positions may be automatically selected by utilizing the measurement values of the position/orientation sensor incorporated in the HMD. Or the additional marker registration operation may be attained by pressing the slice button twice at different positions.

In order to improve the position calculation precision of the additional marker, the marker position may be calculated using sense images sensed at different times in addition to the right and left sense images.

The additional marker 50 is registered as a regular marker by setting the marker ID, size, and shape as marker information in addition to the calculated color and world coordinate value of the additional marker 50 (regular marker registration).

Figure 2:
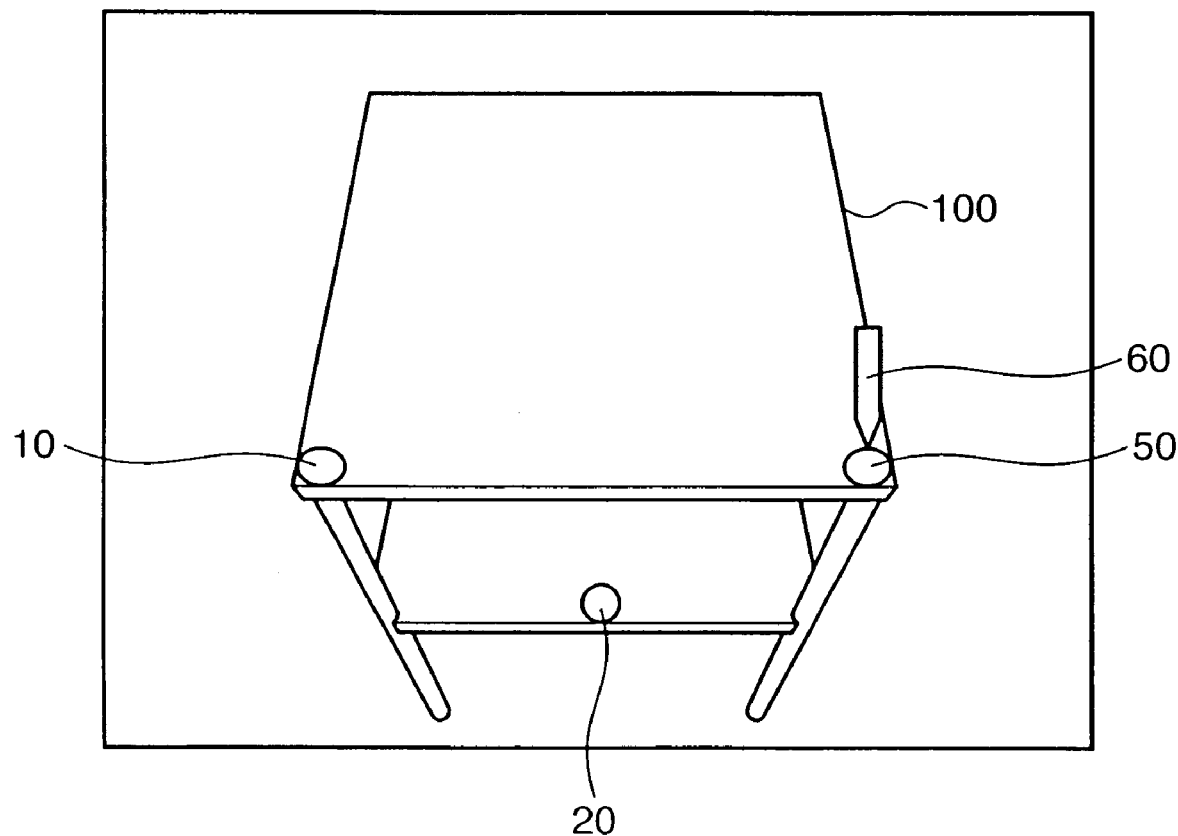
FIG. 2 shows a state of registration of a vague marker.

As shown in FIG. 2, if the world coordinate value of the additional marker 50 cannot be calculated as the number of registered markers in the HMD sense image is insufficient (in this case, less than three markers, only the markers 10 and 20), the additional marker 50 is registered as "vague marker" whose world coordinate value is unknown (vague marker registration).

The vague marker is re-registered as a regular marker when its world coordinate value is calculated while the MR system is active.

Figure 3:
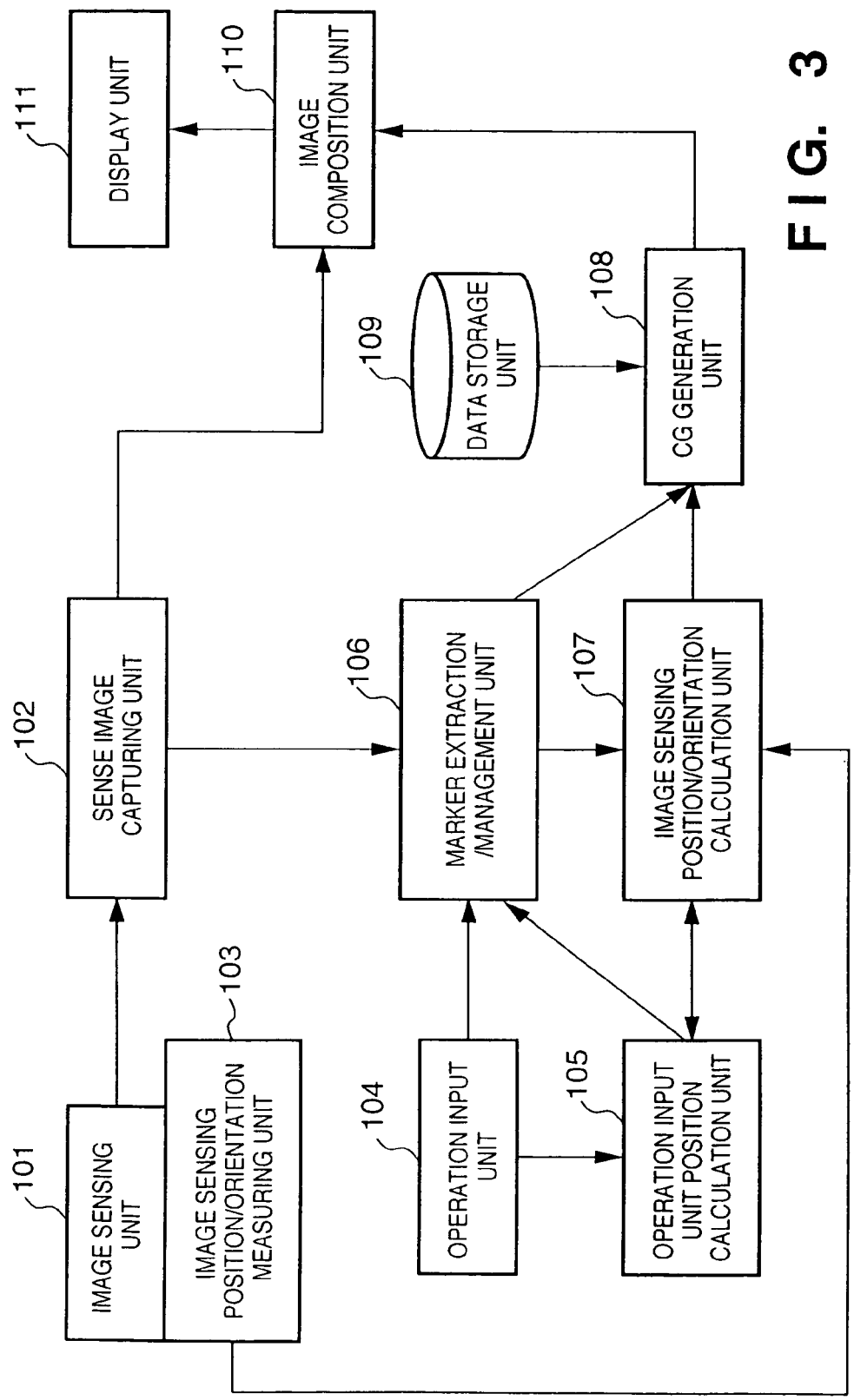
FIG. 3 is a schematic block diagram showing the arrangement of an MR system according to the first embodiment.

FIG. 3 is a schematic block diagram showing the arrangement of the MR system of this embodiment.

Referring to FIG. 3, reference numeral 101 denotes an image sensing unit, which is a camera incorporated in the HMD in this case. The image sensing unit 101 senses an image observed by the user, and outputs the sense image to a sense image capturing unit 102 as an image signal.

Reference numeral 102 denotes a sense image capturing unit, which converts the image signal input from the image sensing unit 101 into formats respectively suitable for an image composition unit 110 and marker extraction/management unit 106, and outputs the converted signals to the image composition unit 110 and marker extraction/management unit 106.

Reference numeral 103 denotes an image sensing position/orientation measuring unit. The image sensing position/orientation measuring unit 103 is incorporated in the HMD, and outputs the position/orientation information of the image sensing unit 101 in response to a request from an image sensing position/orientation calculation unit 107 or irrespective of a request from that unit. Note that, for example, a geomagnetic sensor, gyro, or optical sensor may be used as the image sensing position/orientation measuring unit 103.

Reference numeral 104 denotes an operation input unit. The operation input unit 104 is implemented by various interface devices, and inputs a user's input signal as data. The operation input unit 104 is implemented by a stylus UI with a button, whose position and orientation can be measured, in this embodiment. The operation input unit 104 receives the aforementioned additional marker registration command from the user, and outputs the position/orientation information of the stylus as signals. The operation input unit 104 converts input signals into appropriate formats, and outputs the additional marker registration command to the marker extraction/management unit 106 and stylus position/orientation information to an operation input unit position calculation unit 105.

Reference numeral 105 denotes an operation input unit position calculation unit. The operation input unit position calculation unit 105 calculates the position of the stylus on the HMD sense image on the basis of the position/orientation information of the operation input unit 104 input from it, and the camera position/orientation information input from the image sensing position/orientation calculation unit 107. The stylus position information calculated by the operation input unit position calculation unit 105 is output to the marker extraction/management unit 106. When the position information fails to calculate (e.g., when the stylus points to an inappropriate range in the operation unit 104), the operation input unit position calculation unit 105 outputs error information.

Reference numeral 106 denotes a marker extraction/management unit which executes (a) an extraction process of registered markers, (b) a process for re-registering a vague marker as a regular marker, and (c) a process for registering an additional marker as a regular marker. Note that the marker extraction/management unit 106 includes a memory (marker registration memory) for holding registered markers.

The processes (a) to (c) executed by the marker extraction/management unit 106 will be described below.

(a) Extraction Process of Registered Markers

The marker extraction/management unit 106 extracts registered markers from a sense image captured by the sense image capturing unit 102 in accordance with marker information (marker ID, color, shape, size, world coordinates, and the like) already registered in the marker registration memory. At this time, regular markers whose world coordinates are known and a vague marker whose world coordinates are unknown are extracted. Of the registered markers, those which are not "vague marker" (i.e., markers whose world coordinates are known) will be referred to as "regular markers" hereinafter. Note that whether the extracted marker is a "regular marker" or "vague marker" is identified by its marker ID.

Normally, the HMD comes with two image sensing devices for the right and left eyes. Since the position/orientation relationship between the two image sensing devices is fixed, the position/orientation information of one image sensing device allows to calculate the position and orientation of the other device. For this reason, the marker extraction/management unit 106 of this embodiment applies marker extraction to either of the right and left sense images.

The information of each extracted registered marker is output to the image sensing position/orientation calculation unit 107 as extracted registered marker information. Note that the extracted registered marker information includes image sensing position information as an actually measured value of that marker position on the sense image.

(b) Process for Re-Registering Vague Marker as Regular Marker

When a vague marker is included in the extracted registered markers, and the number of regular markers is large enough (three or more markers in this embodiment) to calculate the world coordinates of the vague marker, the marker extraction/management unit 106 calculates the world coordinates of the vague marker. When a single marker whose image sensing position and orientation can be calculated from itself is used, if the HMD image sensing device perfectly captures one marker, the world coordinates of the vague marker can be calculated.

Since two pieces of position information of the vague marker in two sense images whose image sensing positions and orientations are known are required to calculate the world coordinates of the vague marker, the vague marker is also extracted from the sense image which does not undergo marker extraction in the process (a). Then, the world coordinates of the vague marker are calculated based on the triangulation using the two, right and left sense images. When the world coordinates of the vague marker are successfully calculated, the calculated world coordinates are registered in the marker registration memory as the marker information of this vague marker, and the vague marker is re-registered as a regular marker whose world coordinates are known in the marker registration memory.

That is, the process for re-registering the vague marker as a regular marker is automatically done when its world coordinates are calculated while the MR system is active.

(c) Additional Marker Registration Process

When an additional marker registration command is input from the operation input unit 104, the marker extraction/management unit 106 receives the stylus position information on the HMD sense image from the operation input unit position calculation unit 105, detects a marker region having the prescribed shape from an image region near the tip of the stylus on the HMD sense image, and extracts the color of that region as a color of a registered marker. For example, the additional marker 50 shown in FIG. 1C is pointed and extracted by the stylus 60.

When the number of extracted regular markers is large enough (three or more markers in this embodiment) to calculate the world coordinates of the additional marker, the marker extraction/management unit 106 calculates the world coordinates of the additional marker. In this case, as in the case of registration of the vague marker in the process (b), two pieces of position information of the additional marker in two sense images whose image sensing positions and orientations are known are required to calculate the world coordinates of the additional marker. Therefore, the additional marker is also extracted from the sense image which does not undergo marker extraction in the process (a), and the world coordinates of the additional marker are calculated based on the triangulation using the two, right and left sense images.

When the world coordinates of the additional marker are successfully calculated, this additional marker is registered in the marker registration memory as a regular marker.

On the other hand, when the world coordinates of the additional marker cannot be calculated (e.g., when the number of extracted registered markers is not large enough (less than three markers in this embodiment) to calculate the world coordinates of the additional marker), the additional marker is registered as a vague marker.

In this manner, the additional marker registration process is done in response to a command input from the operation input unit 104.

In this embodiment, when the world coordinate value of the additional marker cannot be calculated, it is registered as a vague marker. However, such marker need not always be registered.

These marker registration results are output to the image sensing position/orientation calculation unit 107 as registered marker information.

The image sensing position/orientation calculation unit 107 corrects the position and orientation of the image sensing unit 101 (HMD camera). That is, the unit 107 calculates the theoretical values of the image coordinates of respective regular markers on the basis of the world coordinates of the regular markers input from the marker extraction/management unit 106 and the image sensing position/orientation information of the image sensing unit 101 input from the image sensing position/orientation measuring unit 103. Then, the unit 107 calculates the position and orientation of the image sensing unit 101 to minimize the sum of errors between the theoretical values of the image coordinates and the actually measured values of the positions on the sense image output as extracted registered marker information from the marker extraction/management unit 106 for respective regular markers. The calculated position/orientation information is output to a CG generation unit 108.

The CG generation unit 108 reads out the position/orientation information of the image sensing unit 101 from the image sensing position/orientation calculation unit 107, and estimates the position and orientation (direction) of the image sensing unit 101. If the position and orientation of the image sensing unit 101 can be estimated, the visual field of the image sensing unit 101 can be calculated. Hence, the CG generation unit 108 reads out data of a part corresponding to the visual field of the image sensing unit 101 from a data storage unit 109, generates CG data to be synthesized on the visual field of the image sensing unit 101, and outputs that data to the image composition unit 110.

Reference numeral 109 denotes a data storage unit, which comprises, e.g., a hard disk, and holds data to be passed to the CG generation unit 108. Data stored in the data storage unit 109 include, e.g., text information, panoramic image data, 3 D CG data, and the like. The data storage unit 109 outputs appropriate data to the CG generation unit 108 in response to a request from the CG generation unit 108. For example, when the CG generation unit 108 requests 3 D CG data to be synthesized on the visual field of the image sensing unit 101, the data storage unit 109 extracts 3 D CG data included in the visual field of the image sensing unit 101 from the stored 3 D CG data, and outputs it. Note that the data storage unit 109 is not limited to a hard disk, but it may comprise a tape, memory, and the like, as long as it is a storage unit that can hold data.

The image composition unit 110 loads a sense image from the sense image capturing unit 102, and CG data from the CG generation unit 108, and composites the CG data from the CG generation unit 108 onto the sense image from the sense image capturing unit 102.

Reference numeral 111 denotes a display unit which displays a composite image signal output from the image composition unit 110.

Figure 4:
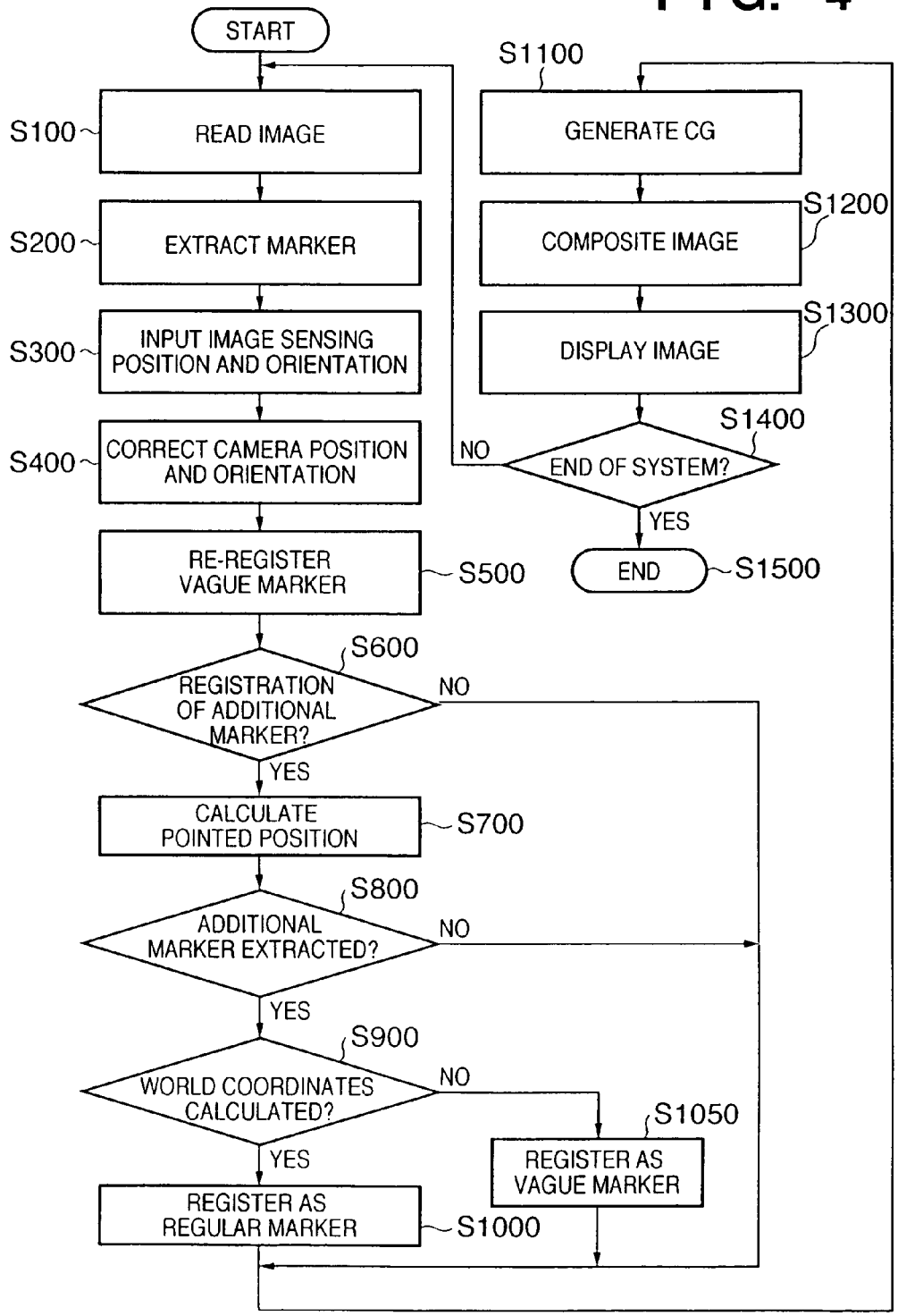
FIG. 4 is a flowchart showing the processing sequence in the first embodiment.

The control of the MR system of this embodiment with the aforementioned arrangement will be explained below. FIG. 4 is a flowchart for explaining the processing sequence in the image composition apparatus of this embodiment. Note that the control of all the aforementioned units is systematically done by a system controller (not shown). The control of the system controller is implemented when a CPU reads out and executes a control program held in a ROM onto a work RAM or the like.

The MR system of this embodiment is activated, and the respective units are initialized. For example, the marker extraction/management unit 106 loads initial setting data associated with markers from the marker registration memory, and the CG generation unit 108 loads data associated with initial settings from the data storage unit 109, so as to make respective initial settings.

In step S100, an image is captured by the image sensing unit 101, and the captured sense image is converted into formats suitable for the subsequent units by the sense image capturing unit 102. The converted image data is supplied to the image composition unit 110 and marker extraction/management unit 106.

In step S200, the marker extraction/management unit 106 extracts markers from the loaded sense image. Then, extracted registered marker information is sent to the image sensing position/orientation calculation unit 107.

In step S300, the image sensing position/orientation measuring unit 103 measures the position and orientation of the image sensing unit 101, and sends the measured position/orientation information to the image sensing position/orientation calculation unit 107.

In step S400, the image sensing position/orientation calculation unit 107 calculates the image sensing position and orientation. That is, the unit 107 calculates the theoretical values of the image coordinates of respective markers on the basis of the world coordinates of the markers input from the marker extraction/management unit 106 and the image sensing position and orientation input from the image sensing position/orientation measuring unit 103. Then, the unit 107 calculates the image sensing position and orientation to minimize the sum of errors between these theoretical values and the actually measured values of the image coordinates output as extracted registered marker information from the marker extraction/management unit 106. In this way, the position and orientation of the image sensing unit 101, i.e., the HMD camera, can be corrected.

In step S500, the marker extraction/management unit 106 re-registers a vague marker as a regular marker. That is, when a vague marker and a plurality of regular markers exist in a sense image, and the world coordinates of the vague marker can be calculated, the vague marker is re-registered as a regular marker.

It is checked in step S600 if an additional marker registration command is input at the operation input unit 104. If the additional marker registration command is input, the operation unit position/orientation information (in this case, the stylus position/orientation information) from the operation input unit 104 is output to the operation input unit position calculation unit 105, and the flow advances to step S700. On the other hand, if no additional marker registration command is input, the flow jumps to step S1100.

In step S700, the operation input unit position calculation unit 105 calculates the position of the operation input unit 104 on the sense image, i.e., the pointed position, on the basis of the operation unit position/orientation information input from the operation input unit 104, and the image sensing position/orientation information input from the image sensing position/orientation calculation unit 107. This calculation result is output as the operation input unit position to the marker extraction/management unit 106.

In step S800, the marker extraction/management unit 106 extracts an additional marker from the sense image input in step S100 in accordance with the operation input unit position input from the operation input unit position calculation unit 105. Note that the flow jumps to step S1100 when the operation input unit position input from the operation input unit position calculation unit 105 is an error and when the additional marker cannot be extracted.

In step S900, the marker extraction/management unit 106 calculates the world coordinates of the additional marker. If the world coordinates of the additional marker can be calculated, the flow advances to step S1000, and the marker extraction/management unit 106 registers the additional marker as a regular marker. On the other hand, if the world coordinates of the additional marker cannot be calculated, the flow advances to step S1050, and the marker extraction/management unit 106 registers the additional marker as a vague marker. After marker registration in either step, the flow advances to step S1100.

In step S1100, the CG generation unit 108 estimates the visual field of the image sensing unit 101 on the basis of the position/orientation information output from the image sensing position/orientation calculation unit 107, acquires data within the range of the visual field of the image sensing unit 101 from the data storage unit 109, and generates CG data.

The generated CG image data is sent to the image composition unit 110. As an example of the CG image data, text data such as position information, a name, and the like corresponding to a landscape image when the HMD camera senses a landscape image may be used.

In step S1200, the image composition unit 110 composites the sense image output from the sense image capturing unit 102, and the CG image data output from the CG generation unit 108. The composite image data is supplied to the display unit 111.

In step S1300, the display unit 111 displays image data input from the image composition unit 110.

After that, it is checked in step S1400 if the system is to end. If the system is to end, the system ends in step S1500; otherwise, the flow returns to step S100 to repeat the aforementioned processes.

As described above, according to this embodiment, when the user of the MR system points to an additional marker position on the HMD sense image while wearing the HMD, the world coordinate values of the additional marker are calculated using the already registered marker information on the system side. That is, since the world coordinates of the position where the marker is added need not be manually measured, the registration of an additional marker can be easily done. Furthermore, since the user can additionally register a marker while wearing the HMD, he or she can lay out a marker on the basis of the viewpoint where MR is experienced, thus improving the operability.

Second Embodiment

The second embodiment according to the present invention will be described below. Note that the arrangement of the MR system in the second embodiment is the same as that of FIG. 3 described in the first embodiment, and a description thereof will be omitted.

In the example of the first embodiment, the stylus is used as a UI used to input the position of an additional marker. However, any other position designation UIs may be used as long as they can designate a marker region. Hence, the second embodiment will exemplify a case wherein a frame indicating a marker region (to be referred to as a marker region designation frame hereinafter) is used as the additional marker region designation UI. Since this marker region designation frame has markers defined in advance (to be referred to as frame markers hereinafter) on its peripheral portion, the frame and a marker region designated by that frame are extracted by extracting these frame markers on the HMD sense image.

Figure 5C:
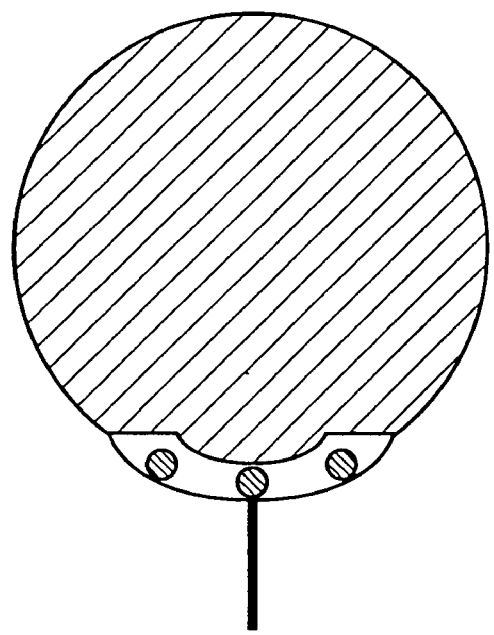
FIG. 5C shows a UI example for marker region designation in the second embodiment.

FIGS. 5A to 5D show examples of the marker region designation frame. As shown in FIG. 5A, the marker region designation frame includes a handle portion 21 held by the hand of the user, and a frame portion 22. For the sake of simplicity, a restriction is imposed so that the marker region designation frame is used to be parallel to the image sensing surface of the HMD camera (image sensing unit 101).

In the frame portions shown in FIGS. 5A to 5D, small circles indicate frame markers, and a hatched portion indicates a marker region. Note that the region of the hatched portion may be clipped or may exist.

After the user lays out an additional marker at a desired position, he or she holds up the marker region designation frame so that a region where the additional marker is laid out is located within the frame (hatched portion). Then, the user presses a marker add button which is defined in advance.

Then, the system can acquire a region designated by the frame by extracting the frame markers formed on the frame outer peripheral portion, and analyzes that region as a marker region, thus attaining marker registration.

In FIG. 5A, a set of three frame markers are laid out on each of the four corners of a rectangular frame. In this case, if at least one set of frame markers can be extracted from the HMD sense image, the marker region can be specified.

In FIG. 5B, a plurality of frame markers are laid out on the periphery of a circular frame. Since one circle is determined if three points are obtained on the circumference, if three arbitrary frame markers can be extracted, a portion inside them can be specified as a marker region.

In FIG. 5C, the number of frame markers in FIG. 5B is limited to three. This frame is effective when it is troublesome to lay out many frame markers on the marker region designation frame.

Figure 5D:
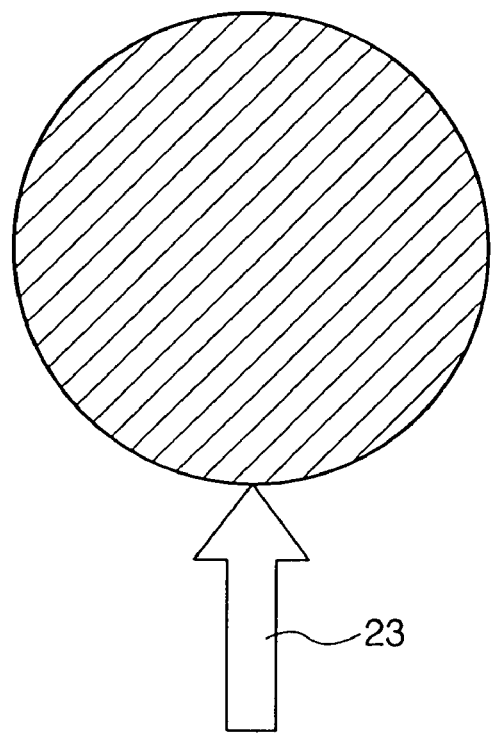
FIG. 5D shows a UI example for marker region designation in the second embodiment.

FIG. 5D shows an example of a frame marker with directionality. That is, reference numeral 23 denotes an arrow-shaped frame marker. A region of a specific shape (e.g., a circle) located at the tip of this marker is defined as a marker region. This frame is effective when the user does not want to set any marker at the boundary of the CG rendering region and CG removal region.

Note that the frame markers may have arbitrary colors. Since general markers use fluorescent colors which are not used by physical objects so as to facilitate their detection, the frame markers preferably have contrasting colors to those of the general markers.

The frame has an arbitrary size, but it must be set to have a size suitable for the marker size. Since the ratio of the frame size occupied in the sense image changes depending on the distance from the HMD camera to the frame, it is effective to set the frame size in consideration of the changing range, i.e., the arm length of a general user or the like.

As described above, according to the second embodiment, when the user wants to add a marker while wearing the HMD, he or she can hold up the marker region designation frame at the additional marker position after laying out the additional marker, thus extracting the additional marker region. Hence, the additional marker registration can be done more easily than in the first embodiment.

Third Embodiment

The third embodiment according to the present invention will be described below. Note that the arrangement of the MR system in the third embodiment is the same as that of FIG. 3 described in the first embodiment, and a description thereof will be omitted.

The third embodiment is wherein the hands and fingers of the user are used in place of the aforementioned marker region designation frame described in the second embodiment. That is, the user forms a peep hole with the hands, and holds it up to an additional marker region position on the HMD sense image, thus designating a marker region. Then, the system extracts the user's hand region from the HMD sense image, and further extracts its internal region (peep hole region), thus obtaining the designated marker region.

Such third embodiment can be easily implemented by adding only a process for extracting the internal region of the hand to a general MR system that performs a hand mask process. That is, the hand mask process normally includes a step of extracting a hand region from an image from the viewpoint of the user, i.e., the HMD sense image, and it is easy to add a step of further extracting the internal region of the hand to such mask process.

Figure 6A:
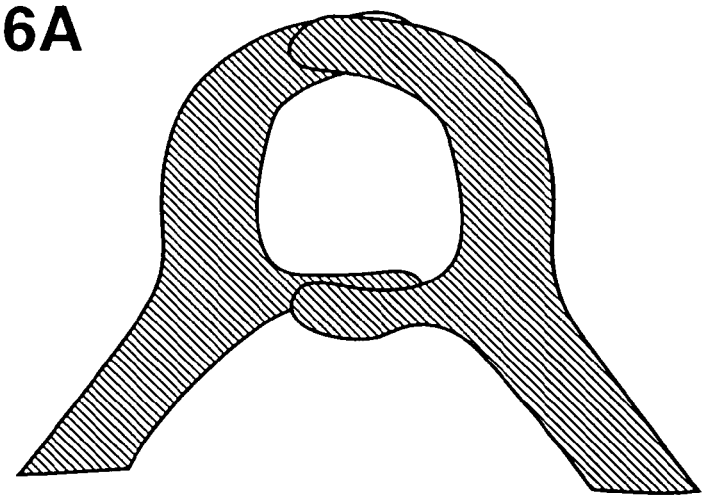
FIG. 6A shows a UI example for marker region designation in the third embodiment.
Figure 6B:
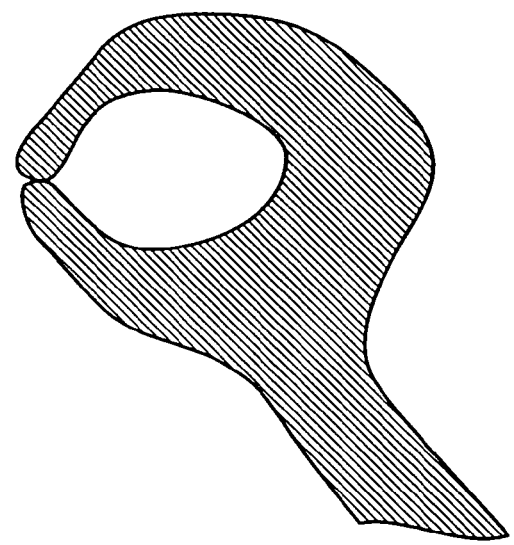
FIG. 6B shows a UI example for marker region designation in the third embodiment.
Figure 6C:
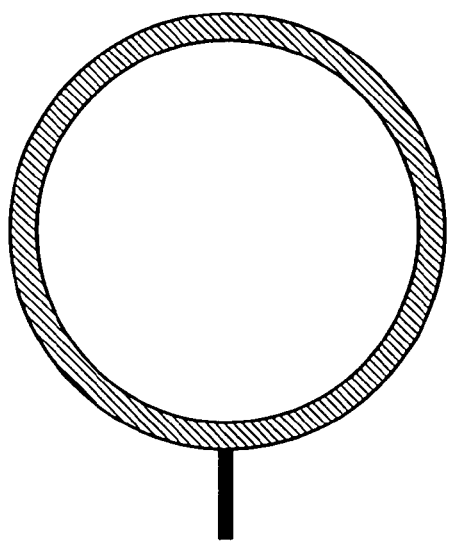
FIG. 6C shows a UI example for marker region designation in the third embodiment.

FIGS. 6A and 6B show designation examples of an additional marker region in the third embodiment. In FIGS. 6A and 6B, a hatched portion indicates an additional marker region frame. FIG. 6A shows an example in which the frame is formed by both hands, and FIG. 6B shows an example in which the frame is formed by a single hand.

Since the third embodiment aims at designating an additional marker region without preparing for any dedicated tools, an example of additional marker designation is defined as the "internal region of the hand region". However, the object of the third embodiment is not implemented by only such hand region designation. For example, when additional marker designation is defined as "internal region of a specific color", a tool with a frame of the specific color can be used as a UI for designating a CG removal region. In this case, the specific color of the frame is not limited to a flesh color corresponding to hand region extraction, but it is preferably set to be a color which is not included in the background color or marker colors.

As described above, according to the third embodiment, when the user wants to add a marker while wearing the HMD, he or she need only form a peep hole by hands and hold it up to the additional marker position after laying out the additional marker, thus extracting the additional marker region. Hence, the registration of an additional marker can be done without using any dedicated tools.

Other Embodiments

Note that the present invention may be applied to either a system constituted by a plurality of devices (e.g., a host computer, interface device, camera, printer, and the like), or an apparatus consisting of a single equipment (e.g., an HMD, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores a program code corresponding to the aforementioned flowchart.

The present invention is not limited to the above embodiments and various changes and modifications can be made within the spirit and scope of the present invention. Therefore, to appraise the public of the scope of the present invention, the following claims are made.

CLAIM OF PRIORITY

This application claims priority from Japanese Patent Application No. 2004-146640 filed on May 17, 2004, the entire contents of which are hereby incorporated by reference herein.

What is claimed is:

1. An information processing method for an information processing apparatus comprising the steps of:
   acquiring a sense image of an image sensing unit with the information processing apparatus;
   acquiring coordinate values of registered indices with the information processing apparatus;
   detecting image positions of the registered indices in the sense image with the information processing apparatus;
   calculating position and orientation of the image sensing unit on the basis of the detected image positions of the registered indices and the coordinate values of the registered indices with the information processing apparatus;
   detecting an image position of an additional index in the sense image in accordance with a user's instruction with the information processing apparatus;
   calculating a coordinate value of the additional index using the image positions of the registered indices, the coordinate values of the registered indices, the position and orientation of the image sensing unit, and the image position of the additional index with the information processing apparatus; and
   registering the calculated coordinate value of the additional index as a registered index with the information processing apparatus,
   wherein when the coordinate value of the additional index cannot be calculated due to insufficient information for calculating the coordinate value, the additional index is temporarily registered as a vague index,
   wherein when the coordinate value of the additional index can be calculated due to sufficient information for calculating the coordinate value, the additional index is regularly registered as a regular index, and
   wherein when the coordinate value of the vague index can be calculated due to sufficient information for calculating the coordinate value, the vague index is re-registered as a regular index.

2. The method according to claim 1, wherein the image sensing unit comprises a video see-through Head Mounted Display.

3. The method according to claim 1, further comprising the step of:
   generating a virtual image on the basis of a position and orientation of the image sensing unit; and
   compositing the sense image and the virtual image.

4. The method according to claim 1, wherein the image position of the additional index is detected based on a position of an operation unit which indicates an additional index on a physical space.

5. The method according to claim 4, wherein information of the registered index includes information for specifying a shape, color information, and ID information in addition to the coordinate value, and
   said method further comprises the steps of:
   detecting a shape region corresponding to the information for specifying the shape in an image region set based on the position of the operation unit; and
   obtaining the color information on the basis of a color in the detected shape region.

6. The method according to claim 4, wherein the operation unit comprises a stylus, and a position of the stylus is measured.

7. The method according to claim 4, wherein the operation unit has a predetermined frame, and designates the additional index by locating the additional frame within the predetermined frame.

8. The method according to claim 1, further comprising:
   detecting a position of a predetermined portion of a user who indicates an additional index on a physical space; and
   detecting the image position of the additional index on the basis of the detection result.

9. An information processing method for an information processing apparatus comprising the steps of:
   acquiring a sense image of an image sensing unit with the information processing apparatus;
   acquiring coordinate values of registered indices with the information processing apparatus;
   detecting image positions of the registered indices in the sense image with the information processing apparatus;
   calculating position and orientation of the image sensing unit on the basis of the detected image positions of the registered indices and the coordinate values of the registered indices with the information processing apparatus;
   detecting an image position of an additional index in the sense image in accordance with a user's instruction with the information processing apparatus;
   calculating a coordinate value of the additional index using the image positions of the registered indices, the coordinate values of the registered indices, the position and orientation of the image sensing unit, and the image position of the additional index with the information processing apparatus;
   calculating a feature amount of the additional index from the sense image with the information processing apparatus; and
   registering the coordinate value and the feature amount of the additional index with the information processing apparatus,
   wherein when the coordinate value of the additional index cannot be calculated due to insufficient information for calculating the coordinate value, the additional index is temporarily registered as a vague index,
   wherein when the coordinate value of the additional index can be calculated due to sufficient information for calculating the coordinate value, the additional index is regularly registered as a regular index, and
   wherein when the coordinate value of the vague index can be calculated due to sufficient information for calculating the coordinate value, the vague index is re-registered as a regular index.

10. The method according to claim 9, wherein the feature amount is color information.

11. An information processing apparatus comprising:
    first acquisition means for acquiring a sense image of an image sensing unit;
    second acquisition means for acquiring coordinate values of registered indices;
    detecting means for detecting image positions of the registered indices in the sense image;
    calculating means for calculating position and orientation of the image sensing unit on the basis of the detected image positions of the registered indices and the coordinate values of the registered indices;
    detection means for detecting an image position of an additional index in the sense image in accordance with a user's instruction;
    calculation means for calculating a coordinate value of the additional index using image positions of the registered indices, the coordinate values of the registered indices, the position and orientation of the image sensing unit, and the image position of the additional index; and registration means for registering the calculated coordinate value of the additional index as a registered index, wherein when the coordinate value of the additional index cannot be calculated due to insufficient information for calculating the coordinate value, the additional index is temporarily registered as a vague index, wherein when the coordinate value of the additional index can be calculated due to sufficient information for calculating the coordinate value, the additional index is regularly registered as a regular index, and wherein when the coordinate value of the vague index can be calculated due to sufficient information for calculating the coordinate value, the vague index is re-registered as a regular index.

12. An information processing apparatus comprising:

first acquisition means for acquiring a sense image of an image sensing unit;

second acquisition means for acquiring coordinate values of registered indices;

detecting means for detecting image positions of the registered indices in the sense image;

calculating means for calculating position and orientation of the image sensing unit on the basis of the detected image positions of the registered indices and the coordinate values of the registered indices;

detection means for detecting an image position of an additional index in the sense image in accordance with a user's information;

first calculation means for calculating a coordinate value of the additional index using image positions of the registered indices, the coordinate values of the registered indices, the position and orientation of the image sensing unit, and the image position of the additional index;

second calculation means for calculating a feature amount of the additional index from the sense image; and registration means for registering the coordinate value and the feature amount of the additional index, wherein when the coordinate value of the additional index cannot be calculated due to insufficient information for calculating the coordinate value, the additional index is temporarily registered as a vague index, wherein when the coordinate value of the additional index can be calculated due to sufficient information for calculating the coordinate value, the additional index is regularly registered as a regular index, and wherein when the coordinate value of the vague index can be calculated due to sufficient information for calculating the coordinate value, the vague index is re-registered as a regular index.

13. A computer-readable medium encoded with a computer program for controlling an information processing apparatus, comprising:

a program code of a first acquisition step of acquiring a sense image of an image sensing unit;

a program code of a second acquisition step of acquiring coordinate values of registered indices;

a program code of a detecting step of detecting image positions of the registered indices in the sense image;

a program code of a calculating step of calculating position and orientation of the image sensing unit on the basis of the detected image positions of the registered indices and the coordinate values of the registered indices;

a program code of a detection step of detecting an image position of an additional index in the sense image in accordance with a user's instruction;

a program code of a calculation step of calculating a coordinate value of the additional index using the image positions of the registered indices, the coordinate values of the registered indices, the position and orientation of the image sensing unit, and the image position of the additional index; and a program code of a registration step of registering the calculated coordinate value of the additional index as a registered index, wherein when the coordinate value of the additional index cannot be calculated due to insufficient information for calculating the coordinate value, the additional index is temporarily registered as a vague index, wherein when the coordinate value of the additional index can be calculated due to sufficient information for calculating the coordinate value, the additional index is regularly registered as a regular index, and wherein when the coordinate value of the vague index can be calculated due to sufficient information for calculating the coordinate value, the vague index is re-registered as a regular index.

14. A computer-readable medium encoded with a computer program for controlling an information processing apparatus, comprising:

a program code of a first acquisition step of acquiring a sense image of an image sensing unit;

a program code of a second acquisition step of acquiring coordinate values of registered indices;

a program code of a detecting step of detecting image positions of the registered indices in the sense image;

a program code of a calculating step of calculating position and orientation of the image sensing unit on the basis of the detected image positions of the registered indices and the coordinate values of the registered indices;

a program code of a detection step of detecting an image position of an additional index in the sense image in accordance with a user's instruction;

a program code of a first calculation step of calculating a coordinate value of the additional index using the image positions of the registered indices, the coordinate values of the registered indices, the position and orientation of the image sensing unit, and the image position of the additional index;

a program code of a second calculation step of calculating a feature amount of the additional index from the sense image; and a program code of a registration step of registering the coordinate value and the feature amount of the additional index, wherein when the coordinate value of the additional index cannot be calculated due to insufficient information for calculating the coordinate value, the additional index is temporarily registered as a vague index, wherein when the coordinate value of the additional index can be calculated due to sufficient information for calculating the coordinate value, the additional index is regularly registered as a regular index, and wherein when the coordinate value of the vague index can be calculated due to sufficient information for calculating the coordinate value, the vague index is re-registered as a regular index.

15. The method according to claim 1, wherein said information for calculating the coordinate value is the number of regular indices.

16. The method according to claim 9, wherein said information for calculating the coordinate value is the number of regular indices.

* * * * *